Aug. 12, 1969   G. G. ALLENBAUGH, JR   3,460,797
HOSE COMPRESSOR
Filed Oct. 5, 1966   2 Sheets-Sheet 1
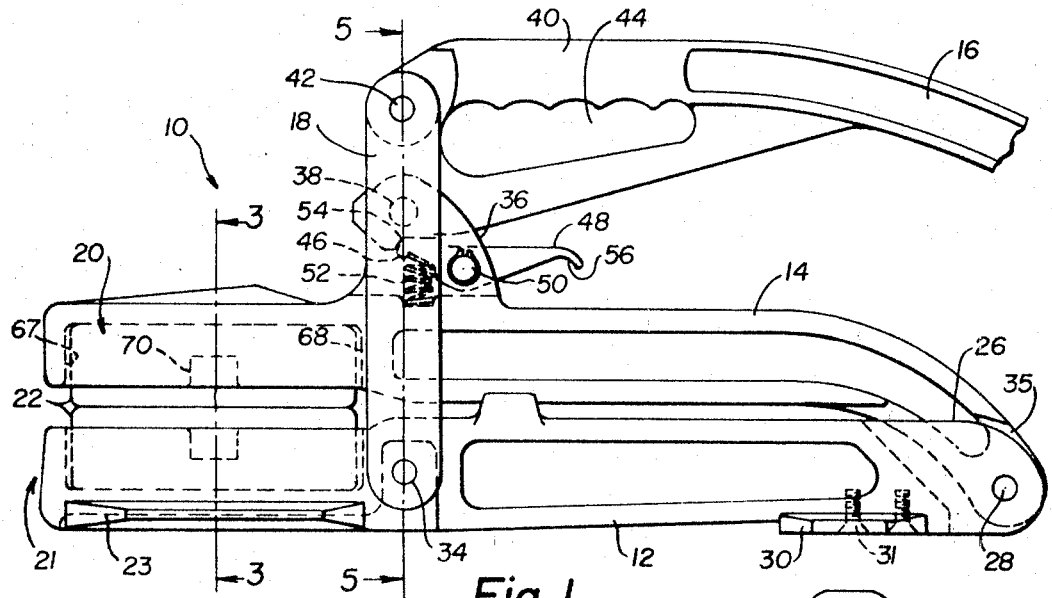
Fig. 1
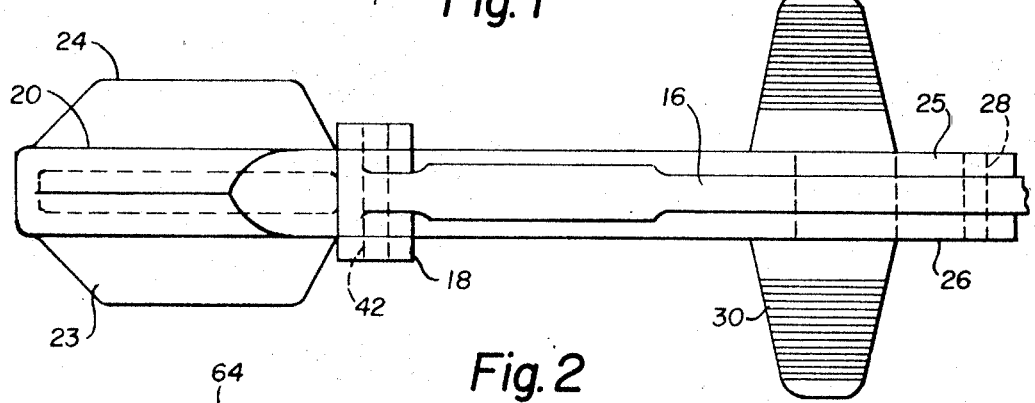
Fig. 2
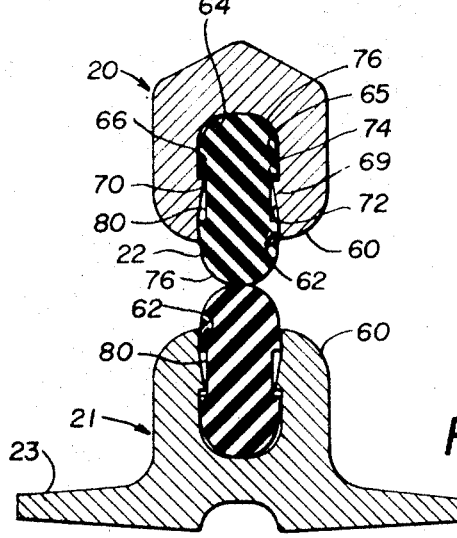
Fig. 3
Fig. 4
INVENTOR
GEORGE G. ALLENBAUGH JR.
BY
*Watts & Fisher*
ATTORNEYS Aug. 12, 1969   G. G. ALLENBAUGH, JR   3,460,797
HOSE COMPRESSOR
Filed Oct. 5, 1966   2 Sheets-Sheet 2

INVENTOR
GEORGE G. ALLENBAUGH JR.
BY
*Watts & Fisher*
ATTORNEYS

United States Patent Office 3,460,797
Patented Aug. 12, 1969

3,460,797
HOSE COMPRESSOR
George G. Allenbaugh, Jr., Rittman, Ohio, assignor to Akron Brass Company
Filed Oct. 5, 1966, Ser. No. 584,477
Int. Cl. F16l 55/10
U.S. Cl. 251—9
9 Claims

ABSTRACT OF THE DISCLOSURE

A hose comparator for preventing or restricting fluid flow through a fire hose. Two pivoted arms form clamping jaws actuated by a lever that closes and holds the jaws in a clamping position. Removable elastomeric inserts loosely received and held in each jaw contact the hose and deform under clamping pressure, providing an effective seal, reducing damage to the hose and resisting movement of the compressor along the hose.

---

This invention relates to a hose compressor, and more particularly to a compressor for use with fire hoses.

Hose compressors or hose clamps, as they are more frequently referred to in the trade, are applied across a hose to compress the hose walls together to stop or restrict flow through the hose.

Hose clamps that are used for fire hoses are relatively large assemblies having two pivoted arms with jaws that receive the hose, and a lever for opening and closing the jaws. These clamps are powerful enough to close a hose while water is flowing at the pressures normally used in fighting fires. These clamps are used by firemen to shut off the flow of water in a hose for such purposes as permitting a nozzle to be changed or additional lengths of hose to be added.

A variety of types of fire hoses are presently in use. These include the so-called single and double jacketed hoses and also the more recent plastic hoses. These hoses not only vary in size, but also in wall thickness. Ideally, a hose clamp should be operable with all types of hoses that are in use.

Prior proposals have been made to provide a hose clamp that will shut off a variety of hose sizes. One proposal utilizes a removable pivot pin with an over center linkage and actuating lever for operating the clamping jaws. Spaced holes in the linkage provide an adjustment for different thicknesses of the hose being clamped. Two different holes are needed for single and double jacketed hoses, and additional holes would be required for plastic hose. A second proposal employs a ratchet that allows an operator to clamp the jaws together to the extent desired, in increments provided by the teeth of the ratchet. In both proposals rigid jaws are closed upon the hose, to force opposite portions of the hose wall together. In both proposals the jaw spacing can be varied only through a limited number of increments determined by hole spacing or ratchet teeth construction.

Due to the limited adjustment of the known clamps, there is no way to compensate for small variations in hose wall thickness. Moreover, with the hard, rigid jaws of the prior art clamps, the sides of the hose tend to be closed, but the clamps often fail to fully close the center of the hose. As a result, there is leakage.

A further problem is that the prior devices tend to damage the hose wall when they are clamped with sufficient pressure to stop the flow of water.

Another problem has been that the hard jaws, which are smooth to reduce hose damage, tend to slide down the hose as soon as clamping pressure is applied. Even worse, when the clamp is released, the sudden flow of water down the hose tends to kick the hose clamp forward, and it has been important for the operator to open the clamp quite rapidly. Care and skill are required to avoid injury.

In accordance with the present invention, an improved clamp is provided that overcomes the disadvantages of known clamps. This clamp (1) is suitable for use with hoses of different wall thicknesses without mechanical adjustment, (2) fully closes the hose to completely stop any flow of water, (3) resists the tendency of the water pressure to slide the clamp along the hose, and (4) prevents damage to the hose wall by the jaws of the clamp.

In addition to overcoming all of the listed disadvantages of prior clamps and others, the clamp of the present invention has capabilities which no prior clamp has had. Notably, one may use the clamp of this invention to meter the flow of water through a hose. Thus this clamp is not simply an "on-off" device, it can also function as a volume control device.

The present clamp is formed of two arms pivoted together at one end and forming opposed clamping jaws at the other end. Each of the opposed jaws of the clamp has a face with an elongated recess or groove along its length. A removable rubber insert is provided for each jaw. The insert extends along the length of the groove in the jaw, and includes a curved surface of generally the configuration of a segment of a cylinder that extends from the jaw face. The jaw insert is somewhat smaller than the receiving groove and is loosely held in the groove.

The inserts are resilient and soft enough to deform when clamped against a fire hose with sufficient pressure to compress the hose against the pressure of liquid flowing through the hose. It is important that the jaw insert be loosely rather than rigidly retained in the recess or groove. Thus, it is free to flow or displace into open areas provided in the recess when subjected to a compressive force. Retaining means are provided within the recess which prevent the insert from falling out of the recess when the clamp is transported or when the clamp is being applied to a hose. The construction is such that the retaining means does not interfere with the flow or displacement of the insert when under compression.

When a hose is compressed with the clamp of this invention, the rubber inserts apply a uniform force across the hose, because they readily deform to variations in hose thickness. The inserts also accommodate large variations in wall thickness. Thus, with a single, over-center, lever-operated, clamp, the flexibility of the inserts permits the sealing of all types of hoses. A complete seal is further assured because the construction of the insert and recess of each jaw allows the insert to deform within the jaw recess. This causes the insert to roll and distort to a limited extent somewhat in the manner of an O-ring when necessary to effect a seal, even if the initial closure contact is not fully effective.

The material of the jaw insert provides a relatively high coefficient of friction with the outer wall of the hose. In addition, the relatively soft, deformable, material of the jaw insert bites into the weave of the hose jacket. These features effectively resist the tendency of the fluid pressure in the hose to slide the clamp along the hose length. This not only overcomes any tendency of the clamp to shift along the hose when in a fully clamped position, but also permits the clamp to be opened slowly without danger that the clamp will be kicked down the hose by the initial surge of water flow. As a result, this clamp is considerably safer to use than prior clamps. This also permits the clamp to be held in a partially open position, either by temporary pressure on the operating lever or by providing intermediate locking positions. In such partially opened position the clamp restricts the volume flow.

These and other features and attendant advantages of this invention will be readily appreciated as the same become better understood by reference to the following detailed description, when considered in connection with the accompanying drawings, in which:

FIGURE 1 is a side elevational view of a hose clamp constructed in accordance with the present invention;

FIGURE 2 is a top plan view of the hose clamp of FIGURE 1;

FIGURE 3 is a transverse sectional view of the hose clamp taken along the line 3—3 of FIGURE 1 and looking in the direction of the arrows, showing the cross sectional contour of the jaw inserts and the construction of the jaw recesses and insert retaining means;

FIGURE 4 is a side elevational view of a jaw insert;

Figure 5:
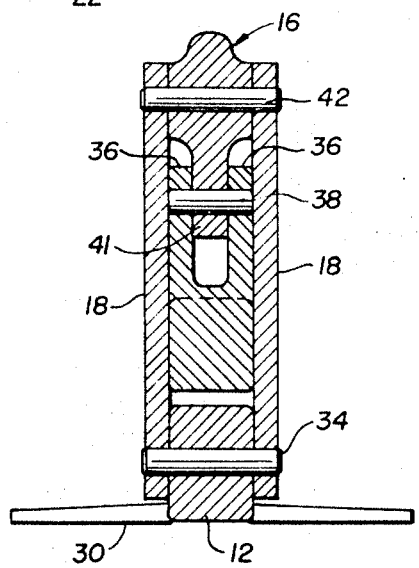
FIGURE 5 is a transverse sectional view of the hose clamp taken along the line 4—4 of FIGURE 1, and looking in the direction of the arrows, illustrating the construction of the clamping linkage.

Referring now to the drawings, the general arrangement is best understood from FIGURES 1, 2 and 5. The overall hose clamp assembly is indicated generally at 10 and is approximately 2½ feet in overall length. It is basically comprised of a base arm 12, a clamping arm 14 pivoted to the base arm 12, a handle 16 pivoted to the clamping arm, and toggle arms 18 connecting the handle with the base arm 12. Clamping jaws, indicated generally at 20 and 21, are formed by free ends of the base arm 12 and clamping arm 14. A resilient jaw insert 22 is received in a recess of each jaw and extends from the recess to provide resilient clamping surfaces.

The base arm 12 is of generally elongated configuration. Relatively flat stabilizing portions 23, 24 extend laterally from the base arm 12 beneath the clamping jaw 21. The opposite end of the base arm 12 is bifurcated to provide a vertical slot formed by spaced portions 25, 26. One end of the clamping arm 14 is received between the spaced portions 25, 26. An arm pivot pin 28 passes through portions 25, 26 and through the clamping arm 14, connecting the base arm and clamping arm together for pivotal movement.

A foot plate 30 is secured, as by machine screws 31, to the bottom of the base arm 12, just forward of the pivot pin 28. The foot plate 30 provides surfaces extending from each side of the hose clamp 10 flush with the base at the rear of the clamp. This allows the operator to maintain the clamp in place with his foot while closing the jaws with the handle 16.

A toggle pivot pin 34 pivotally secures lower ends of spaced toggle arms 18 to the base arm 12 adjacent the clamping jaw 21. One toggle arm is located on each side of the base arm 12, and the two toggle arms extend upward on opposite sides of the clamping arm 14 and handle 16.

The clamping arm 14 is of generally elongated configuration, of similar length to the base arm 12 but is downwardly curved at the back end, which is pivoted to the base arm. A portion 35 of the curved, back, end of the clamping arm 14 is narrower than the remainder of the arm and fits between the spaced portions 25, 26 of the base arm 12. This narrow portion 35 receives the arm pivot pin 28, as already described. Except for the curved back end, the major portion of the clamping arm 14 is essentially parallel with the base arm 12 when in closed position. A split extension from the clamping arm 14 forms two spaced ears 36 that extend upward from the top of the clamping arm 14 adjacent the jaw 20 to secure the handle 16.

The handle 16 is elongated, with a front section 40 that is generally triangular-shape in side elevation. A lower corner portion 41 of the triangular-shaped front section 40 is of reduced thicknesses. See FIGURE 5. This portion 41 is received between the ears 36 and is pivotally secured to the ears by a handle pivot pin 38. An upper portion (as oriented in FIGURE 1) of the front section 40 of the handle 16 lies between the upper ends of the two toggle arms 18. A toggle connecting pin 42 passes through the upper ends of the toggle arms 18 and the handle 16, providing a pivotal connection. A finger opening 44 is provided in the front section 40 to provide a carrying handle.

The front lower portion 41 of the handle includes a notch 46 located beneath the handle pivot pin 38 when the handle is in closed position, as shown in FIGURE 1. The notch 46 faces to the rear of the clamp. A detent 48 is located between the spaced ears 36, pivotally supported by a pivot pin 50. The detent 48 is biased in a clockwise direction, as oriented in FIGURE 1, by a coil spring 52. A latch end 54 engages the notch 46 to retain the handle 16 in closed position. The detent 48 also has a trigger end 56 that extends from between the ears 36 to facilitate rotating the detent 48 in a counter-clockwise direction to release the handle 16.

Figure 6:
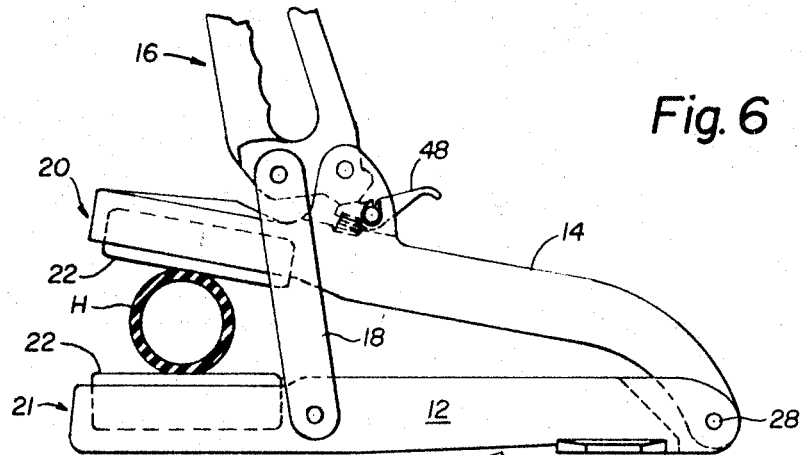
FIGURE 6 is a diagrammatic side elevational view of the hose clamp of FIGURE 1, shown in open position, with a hose section between the open jaws.
Figure 7:
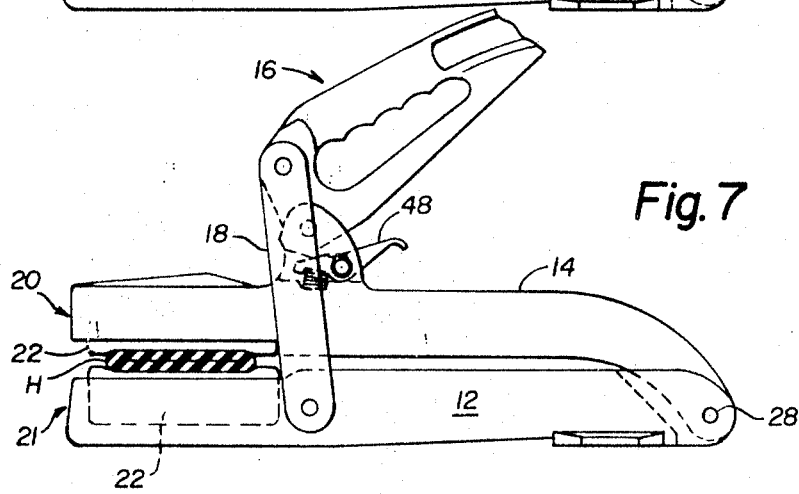
FIGURE 7 is a diagrammatic side elevational view of the hose clamp of FIGURE 1, similar to FIGURE 5, but showing the clamp in partially closed position with a section of hose compressed between the opposing jaws of the clamp.

As best shown in FIGURES 6 and 7 of the drawings, a forward movement of the handle 16 after the detent 48 is released moves the toggle connecting pin 42 and the toggle arms 18 forward. At the same time, the handle 16 pivots about both the toggle connecting pin 42 and the handle pivot pin 38. Because the handle pivot pin 38 is lower than the pin 42 the clamping arm 14 is lifted, pivoting about the arm pivot pin 28. This opens the clamping jaws 20, 21. Movement of the handle in the opposite direction, as shown in FIGURE 7, closes the clamping jaws. A high mechanical advantage is achieved with this arrangement. In addition, the toggle arms 18 hold the jaws in closed position after the handle 16 is completely lowered. Thus, the opening force on the clamp is resisted by the toggle linkage, and there is little or no tendency of the handle to swing open.

The clamping jaws 20, 21 at the free ends of the arms 12, 14 have opposing jaw faces 60, as best shown in FIGURE 3. The opposing jaw faces 60 are parallel and spaced from each other. They are convexly curved in transverse cross section. In the orientation shown in the drawings, the faces extend horizontally a distance sufficient to accommodate the width of a conventional fire hose after it has been compressed to a flat configuration, as shown in FIGURE 7. Typically, the length of the opposing jaw faces 60 is about six inches. Each opposing jaw face 60 includes an elongated recess 62. The upper and lower jaw faces 60 and recesses 62 are mirror images of each other, and therefore only the construction of the upper clamping jaw 20 will be described in detail.

The recess 62 of jaw 20 extends substantially the length of the jaw face 60, and in the preferred construction is deeper than it is wide. The depth of the recess 62 terminates with a locating surface 64 that is concave in transverse section and formed of straight-line longitudinal elements. Spaced, opposed, side surfaces 65, 66, of the recess 62 are generally flat and parallel. Narrow end walls 67, 68 (FIG. 1) are also generally flat and parallel.

Two insert retaining projections 69, 70 extend from the spaced side walls 65, 66 of the recess 62. As best shown in FIGURE 1, the projections 69, 70 are relatively short in length and located centrally of the longitudinal length of the recess 62. The shape of each projection 69, 70 is best shown in FIGURE 3. The projections extend from the respective walls 65, 66 into the recess 62 to form an irregularity constructed to engage the insert and retain it in the recess. At the same time, the projections permit limited movement and purposeful removal of the insert.

Each projection 69, 70 includes a first inclined surface 72 that slopes from the respective side wall 65, 66, beginning at a location spaced from the opening of the recess 62 in the jaw face 60. The surface 72 slopes inward toward the center of the recess 62 and toward the locating surface 64. The slope is gradual and the surface terminates approximately midway of the depth of the recess. It extends only a small distance inwardly from the associated side wall 65, 66.

A second inclined surface 74 completes each insert retaining projection 69, 70. The second surface 74 slopes steeply back to the associated side wall 66, 67 from the inner terminal end of the surface 72. The shape of the insert retaining projections 69, 70 and the shape of the recess 62 cooperates with the jaw inserts 22, as will be described.

Each jaw insert 22 is narrow and elongated, so as to fit within a recess 62 of the jaw. As illustrated in FIGURE 1, the jaw inserts 22 are slightly shorter than the recesses 62. As illustrated in FIGURE 3, they are of a width similar to the width of the recesses 62 but are substantially greater in height than the depth of the recesses. The inserts are formed of straight-line, longitudinal elements, with upper and lower surfaces 76 that are curved in transverse cross section. Side faces 78, generally flat or slightly convex, extend between the curved surfaces 76 and contact the side walls 65, 66 of the recess. The inserts 22 are symmetrical about a longitudinally extending central plane that is horizontal in the orientation of FIGURES 1 and 3, so that they may be reversed in the event one of the surface portions 76 becomes worn or damaged.

The curved surfaces 76 are of identical contour and extend the length of the insert. These surfaces 76 are curved to a shorter radius or radii than the curvature of the locating surface 64 at the base of the recess 62. As a result, the insert 22 does not fully contact the locating surface 64. Rather, substantial spaces are provided between the insert and the curved locating surface 64 on opposite sides of a longitudinal vertical plane passing through the insert and cavity 62. See FIGURE 3. These spaces permit the insert to deform and flow within the recess 62 when subjected to a compressive load.

Each opposite side face 78 of the inserts contain a central indentation in the form of a rectangular depression 80. See FIGURE 4. The length of the indentation 80 is substantially equal to the length of the insert retaining projections 69, 70. The width of the indentation 80 is slightly in excess of the width of the insert retaining projections, including both the first surface 72 and the second surface 74. The depth of the indentation is essentially equal to the distance that the projection 69 or 70 extends inward from the recess wall. The rectangular indentation 80 is formed with sharp edges and flat surfaces, as best shown in FIGURE 3. Due to the resiliency of the jaw insert 22, the portions surrounding the indentation 80 are compressed by the inclined surfaces 72 of the insert retaining projections when the insert is forced into the cavity 62. The insert expands as it passes the projections 69, 70. When fully inserted, an upper edge 81 and side edges 82, 83 of the rectangular indentation 80 cooperate with the insert retaining projection on each side of the recess 62 to retain the insert 22 within the recess.

The jaw inserts 22 are formed of an elastomeric material so that they are resilient and can deform under stress. They are not rigidly secured in a fixed position in the recesses 62, but rather are free to flow or displace into open areas provided in the recess. The retaining projections 69, 70 do not interfere with such flow or displacement under pressure.

Elastomeric inserts having a Shore Durometer hardness of between 65 to 80 deform satisfactorily for use with the various thicknesses of conventional fire hoses used today and with the typical water pressures encountered in use. By way of example, a jaw insert of synthetic rubber having a Shore Durometer hardness of 75 has been found particularly suitable. Typically, synthetic rubbers or other elastomeric materials within the hardness range indicated will deform in the suitable manner required under the compressive pressures used to clamp a fire hose. This deformation or distortion is sufficient to accommodate the various dimensional thicknesses of hoses in use without mechanical adjustments to the hose clamp. It is also sufficient to exert an essentially uniform pressure across the entire width of the flattened hose, which characteristically does not have an even wall section. In addition, the coefficient of friction between the jaw insert and the hose is large because of the surface characteristics of the elastomeric material and because the weave of the hose jacket bites into the deformable inserts, providing a firm grip that retards relative sliding.

In operation, and as best illustrated in FIGURES 6 and 7, the clamp is opened by first pivoting the detent 48 counter-clockwise to release the handle 16. The handle 16 is then swung upward and forward to the position shown in FIGURE 5, about the handle pivot pin 38 and connecting pin 42 of the toggle arms 18. This pivots the clamping arm 14 about the arm pivot pin 28, to a raised position. With the clamping jaws 20, 21 spaced vertically as shown in FIGURE 6, a fire hose H is placed between the jaws, resting on the lower jaw insert 22. The handle 16 is then pivoted back and downward, through the position shown in FIGURE 7 of the drawings. As shown in FIGURE 7, the hose clamp has flattened the hose H until the opposite walls of the hoses are in contact across the width of the hose. The jaw inserts 22 have deformed within the jaw recesses and outside the recesses across the hose to apply a substantially uniform pressure across the entire width of the hose, notwithstanding variations in the wall thickness of the hose. Further movement of the handle 16 from the position shown in FIGURE 7 to the close position of FIGURE 1, completes the clamping action. In this position, the toggle arms 18 are over-center and retain the clamping arm 14 in closed position relative to the base arm 12. The detent 48 locks the handle 16 in lower position so that the hose H will remain clamped until the detent 48 is released and the handle 16 raised.

Because the jaw inserts 22 are loosely held within the cavity 62 of the opposing jaws, the elastomeric material of the inserts 22 can flow and adjust to the necessary contour as it is deformed by the compressive pressure. In this manner, it is able to function somewhat in the manner of an O-ring to properly apply closing pressure to the hose H and to compensate for different wall thickesses.

From the above description of the apparatus and the operation of the hose clamp, it will be apparent that a hose clamp has been provided that will accommodate fire hoses of different wall thickness without requiring adjustment of the clamp. Rather, deformable elastomeric jaw inserts compensate for variations in hose wall thickness. The inserts provide a hose contacting surface with an effectively high coefficient of friction with respect to the hose, to resist relative sliding. In addition, the inserts protect the hose jacket from damage that would be caused by rigid jaws. Thus, a versatile clamp has been provided that is effective in operation, convenient and safe to operate, and which minimizes damage to the hose from the clamping jaws.

While a preferred embodiment of this invention has been described with particularity, it will be readily understood that many modifications and alterations may be made therein without departing from the spirit and scope of the invention, as set forth in the appended claims.

What is claimed is:

1. A hose compressor comprising:
    (a) two opposed relatively movable rigid jaws having elongated opposing faces,
    (b) an elongated recess in each jaw opening through the jaw face, the recesses being aligned with each other, (c) an elongated, elastomeric, normally uncompressed jaw insert loosely located in each recess and in part extending from the recess, beyond the jaw face, (d) each recess being larger than the jaw insert and constructed of a shape with respect to the shape of the jaw insert to permit distortion of the jaw insert within the associated recess when the insert is subjected to a compressive load, (e) means engaging the jaw inserts and retaining them within the associated recess while permitting the insert to distort within the recess under a compressive load, (f) means to support said opposed jaws for relative movement toward and away from each other, and (g) means to move said opposed jaws toward and away from each other.

2. The hose compressor of claim 1 wherein the jaw recesses have spaced, elongated, side wall portions and irregularities at opposed locations of the side wall portions adapted to engage and retain a jaw insert.

3. The hose compressor of claim 2 wherein the irregularities at opposed locations of the side wall portions are projections that extend partially into the recess, and wherein the jaw inserts each include depressions on opposite sides located to receive the projections.

4. The hose compressor of claim 3 wherein the projections have inclined first surfaces that project from the side wall portions inwardly of the recess opening, and second surfaces that slope back toward the side wall portions inwardly of the recess opening from the said inclined first surfaces, said second surfaces being smaller and more steeply sloped than said first surfaces and adapted to engage the jaw inserts within the depressions when the inserts are located within the recesses of the jaws.

5. The hose compressor of claim 1 wherein the jaw inserts are formed of an elastomer having a Shore Durometer hardness of 65 to 80.

6. The hose compressor of claim 1 wherein each jaw insert includes opposite convex, surfaces curved about a longitudinal axis of the insert and each insert is located within the respective jaw recess with one such curved surface extending along the length of the insert and projecting from the recess, and the opposite curved surface facing inward; and wherein the associated recess is shaped relative to the inwardly facing curved surface of the insert to provide space between portions of the insert and portions of the recess along the axial length of the insert to facilitate deformation of the insert within the recess when under compression.

7. The hose compressor of claim 6 wherein the jaw insert are formed of an elastomer having a Shore Durometer hardness of 65 to 80.

8. The hose compressor of claim 7 wherein the jaw recesses have spaced, elongated side wall portions and a projection extending partially into the recess from each side wall portion and wherein the jaw inserts have depressions located to receive the projections, whereby the jaw inserts are yieldably retained in the jaw recesses.

9. A fire hose compressor having two opposed jaws constructed to receive a fire hose between them and compress the hose by movement toward each other, each said jaw including: a recess along a face of the jaw that opposes the opposite jaw; a deformable, normally uncompressed, resilient jaw insert partially within the recess and partially extending from the recess along the said face of the jaw; said recess being larger in volume than the portion of the insert within the recess when the jaws are open; and means to loosely retain the insert in the recess; whereby the jaw insert deforms both within the recess and outside the recess beyond the jaw face when the opposed jaws are moved together against a hose wall to compress the hose.

References Cited

UNITED STATES PATENTS

| | | | |
|---|---|---|---|
| 788,603 | 5/1905 | Rowell | 251—9 |
| 1,701,411 | 2/1929 | Kellam | 251—9 |
| 1,872,792 | 8/1932 | Neorr | 251—8 |
| 1,897,743 | 2/1933 | Warner | 251—9 |
| 2,588,212 | 3/1952 | Custer | 251—5 |
| 2,825,525 | 3/1958 | Kellam | 251—9 |
| 3,312,149 | 4/1967 | Fleckenstein et al. | 277—178 XR |

WILLIAM F. O'DEA, Primary Examiner

ROBERT G. NILSON, Assistant Examiner